Patented Aug. 21, 1934

1,970,656

UNITED STATES PATENT OFFICE 1,970,656

THIAZOLE COMPOUND AND PROCESS OF PRODUCING THE SAME

Treat B. Johnson, Bethany, Conn., assignor to Winthrop Chemical Company, Inc., New York, N. Y., a corporation of New York No Drawing. Application November 4, 1931, Serial No. 573,034

8 Claims. (Cl. 260—44)

In U. S. Patent No. 1,743,083, granted January 7, 1930, I have described substituted thiazole compounds containing aromatic phenolic substituents which occupy the 4-position in the thiazole ring together with a method whereby such 4-substituted thiazoles may be obtained. Up to the present time, it was not thought possible to produce thiazole compounds containing such aromatic phenolic groups attached to the 2-position of the thiazole ring.

I have now found that thiazole compounds containing an aromatic phenolic group or substituted phenolic group in the 2-position of the thiazole ring can be obtained by the reaction of a phenolic substituted thioamide compound with suitable halogen methylene compounds. The new thiazole compounds, some of which have been described by me in an article appearing in the Journal of the American Chemical Society, vol. 52, page 1585, correspond to the general probable formula:

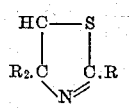

wherein R represents an hydroxy-substituted phenyl radical containing one or more free or substituted hydroxy groups, which hydroxy groups may be in ortho, meta, or para-position, and wherein $R_1$ may be hydrogen or alkyl or subsituted or unsubstituted phenyl, or the aromatic phenolic group as represented by R. The hydrogen of the hydroxy groups, present in R, may be substituted by alkyl groups such as methyl, ethyl or propyl, by acyl groups such as acetyl or propionyl, or two of the oxygens of an ortho-dihydroxyphenyl compound may be joined together by an alkylene linkage, such as methylene or ethylene. The hydrogen of the hydroxy groups may likewise be substituted by aminoalkyl groups, such as aminoethyl- or aminomethyl groups, or by mono- or dialkylaminoalkyl groups. As typical examples of such aromatic phenolic groups occupying the 2-position of the thiazole ring may be mentioned p-hydroxyphenyl, p-methoxyphenyl, 3.4 - dihydroxyphenyl, p-ethoxyphenyl, 3.4 - dimethoxyphenyl, 3.4-diethoxyphenyl, 3.4-methylenedihydroxyphenyl, p - dimethylaminoethoxy - phenyl, p-ethylaminoethoxyphenyl and aminoethoxyphenyl. Typical substituents which may be present in the 4-position of the thiazole ring are alkyl groups, such as methyl, ethyl or propyl, or aryl groups such as phenyl, or alkyl-substituted phenyl groups such as tolyl, or the aromatic phenolic group represented by R as illustrated above.

More particularly, my new products comprise thiazole compounds which in the form of their free bases correspond to the following probable formula:

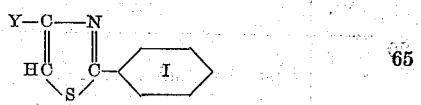

wherein the benzene nucleus designated by "I" contains at least one hydroxy group in the ortho, meta, or para-position, the hydrogen of which may be substituted by alkyl, acyl, aminoalkyl, alkylaminoalkyl or dialkylaminoalkyl, or in case "I" contains two OH groups in the ortho-position the hydrogen of such OH groups may be substituted as stated above, or the two oxygens of such ortho-positioned OH groups may be joined together by an alkylene linkage, and Y may be alkyl, phenyl, alkyl-substituted phenyl, or a substituted or unsubstituted oxyphenyl group as defined above for phenyl group I.

Particularly valuable new compounds may be obtained by reacting a phenylthioamide compound, in which the phenyl radical contains at least one hydroxy substitutent, which compound corresponds to the following formula:

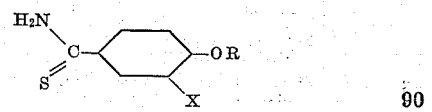

wherein X may be hydrogen, OH, alkoxy, O-acyl, aminoalkoxy, alkylaminoalkoxy or dialkylaminoalkoxy, R may be hydrogen, alkyl, acyl, alkylaminoalkyl, aminoalkyl or dialkylaminoalkyl, or R and X taken together may be an alkylene -O- radical, with a halogen methylene compound of the following formula:

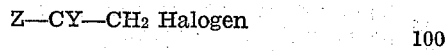

Z—CY—CH$_2$ Halogen wherein Y may be hydrogen, in which case Z stands for two alkoxy groups, or Y may be oxygen in which case Z stands for alkyl, hydroxy phenyl or an aryl radical of the benzene series.

To illustrate, bromo-acetone may be reacted with 3,4-dihydroxythiobenzamide to yield the 2-(3,4-dihydroxyphenyl)-4-methylthiazole according to the following equation:

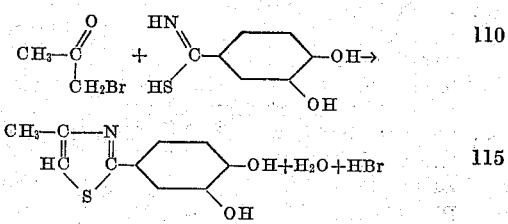

or to illustrate further, bromo-acetal may be reacted with thioanisamide to yield 2-(p-methoxyphenyl) thiazole according to the following equation:

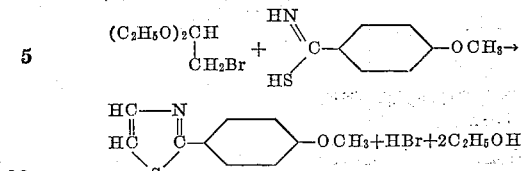

It is to be understood that for the purposes of the present invention the isomeric groupings:

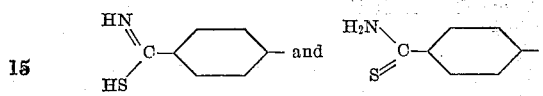

are to be considered as representations of identical compounds.

The new thiazole compounds may be obtained by heating an alcoholic mixture of the parent materials under a reflux for some time. They are generally obtained as oils of relatively high boiling point or as crystalline solids. They may be crystallized from water, dilute or absolute alcohol or other suitable solvents according to the solubilities of the individual thiazole compounds in the solvents mentioned. The hydrochloride or hydrobromide salts are usually obtained in crystalline form by precipitation from their alcoholic solutions by means of ether.

My new compounds may be sometimes obtained in a form containing water of hydration or alcohol of crystallization, or they may be obtained directly in the form of the free bases depending on the individual thiazole compound. The products containing water of hydration or alcohol of crystallization assume the form of the free base at higher temperatures, i. e., the water of hydration or the alcohol of crystallization is readily eliminated by the simple expedient of heating. The strong mineral acid salts of the free bases are easily obtained by the simple expedient of adding such an acid to the free bases after the manner well known in the art. In the claims the term thiazole compound is intended to include the compounds in the form of the free bases or in the equivalent form of the strong mineral acid salts and with or without water of hydration. The new compounds possess a definite physiological efficacy which renders them valuable for medicinal purposes.

The following table conveniently illustrates some of my new thiazole compounds together with the reagents which may be employed in their preparation. Other thiazole compounds will be found disclosed in the examples together with alternative methods of preparing the thiazole compounds listed in the table.

| No. | Thiazole | Reagents | Formula |
|---|---|---|---|
| 1 | 2-(p-methoxyphenyl) | Bromo-acetal and thio-anisamide | $CH\!=\!\!=\!\!\overset{\overset{N}{\rule{1em}{0.4pt}}}{CH}\overset{}{\underset{S}{\rule{1em}{0.4pt}}}CC_6H_4OCH_3$ |
| 2 | 2-(p-hydroxyphenyl) | Demethylation of 1 with 48% HBr | $CH\!=\!\!=\!\!CHSCC_6H_4OH$ |
| 3 | 2-(p-methoxyphenyl)-4-methyl | Chloro-acetone and thioanisamide | $CH_3C\!=\!\!=\!\!CHSCC_6H_4OCH_3$ |
| 4 | 2-(p-hydroxyphenyl)-4-methyl | Demethylation of 3 with 48% HBr | $CH_3C\!=\!\!=\!\!CHSCC_6H_4OH$ |
| 5 | 2-(p-methoxyphenyl)-4-(3,4-dihydroxyphenyl) | Chloro-acetocatechol and thioanisamide | $(HO)_2C_6H_3C\!=\!\!=\!\!CHSCC_6H_4OCH_3$ |
| 6 | 2-(p-hydroxyphenyl)-4-(3,4-dihydroxyphenyl) | Demethylation of 5 with 48% HBr | $(HO)_2C_6H_3C\!=\!\!=\!\!CHSCC_6H_4OH$ |
| 7 | 2-(3,4-dihydroxyphenyl)-4-(3,4-dihydroxyphenyl) | Chloro-aceto-catechol and (3,4-dihydroxy-thiobenz-amide) | $(HO)_2C_6H_3C\!=\!\!=\!\!CHSCC_6H_3(OH)_2$ |
| 8 | 2-(3,4-dihydroxyphenyl) | Bromo-acetal and thiobenz-amide | $CH\!=\!\!=\!\!CHSCC_6H_3(OH)_2$ |
| 9 | 2-(3,4-dihydroxyphenyl)-4-methyl | Chloro-acetone and (thiobenz-amide) | $CH_3C\!=\!\!=\!\!CHSCC_6H_3(OH)_2$ |
| 10 | 2-(3,4-methylene-dihydroxyphenyl) | Bromo-acetal and (Piperonyl thio-amide) | $CH\!=\!\!=\!\!CHSCC_6H_3O_2CH_2$ |
| 11 | 2-3,4-methylene-dihydroxyphenyl)-4-methyl | Chloro-acetone and thio- | $CH_3C\!=\!\!=\!\!CHSCC_6H_3O_2CH_2$ |
| 12 | 2-(3,4-methylene-dihydroxyphenyl)-4-(3,4-dihydroxyphenyl) | Chloro-acetocatechol and (amide) | $(HO)_2C_6H_3C\!=\!\!=\!\!CHSCC_6H_3O_2CH_2$ |
| 13 | 2-(p-diethylaminoethoxyphenyl)-4-methyl | 2-(p-hydroxyphenyl)-4-methylthiazole and diethylamino-ethylchloride | $CH_3C\!=\!\!=\!\!CHSCC_6H_4OC_2H_4N(C_2H_5)_2$ |

The following examples will more particularly serve to illustrate my new processes and products obtainable thereby:

(1) *2 - (para - methoxyphenyl) - thiazole.*—A mixture of 25 grams of thioanisamide of the formula:

$$CH_3OC_6H_4CSNH_2$$

and 30 g. of bromacetal of the formula:

$$(C_2H_5O)_2CHCH_2Br$$

in 75 cc. of 95% alcohol, to which had been added 5 cc. of concentrated hydrochloric acid, was refluxed for three hours. The mixture was diluted with water and upon being made alkaline, the free thiazole base precipitated as an oil. The crude product thus obtained was distilled at 3 mm. pressure, being thereby obtained as a yellow oil boiling at 146–148°. It was further purified as the hydrochloride which precipitated from its ether solution and was converted into the free base as before. Anal. Calcd. for $C_{10}H_9ONS$:N, 7.32. Found, 7.24, 7.25%.

The hydrochloride salt was analyzed for chlorine by the Volhard method. Anal. Calcd. for $C_{10}H_{10}ONSCl$: Cl, 15.58. Found, 15.6, 15.5.

The free base corresponds to the following probable formula:

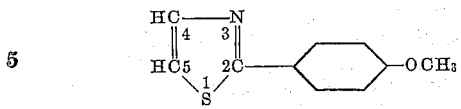

If in the above example 2-para-ethoxythiobenzamide be employed instead of the corresponding thioanisamide, 2-para-ethoxy-phenylthiazole will be obtained. Other alkoxyphenylthiazoles may be obtained by the substitution of the corresponding alkoxythiobenzamide for the thioanisamide illustrated above.

(2) *2 - (para-hydroxyphenyl) -thiazole.*—Nine grams of 2 - (para - methoxyphenyl) - thiazole were heated with 40 cc. of 48% hydrobromic acid under a reflux for 2 hours. The mixture was then diluted with 100 cc. of water and neutralized with ammonia. A white precipitate of 2-(para-hydroxyphenyl)-thiazole formed which was soluble in potassium hydroxide and from which it was precipitated with acetic acid. The product was recrystallized from hot water in which it is slightly soluble. M. P. 163–5°. Anal. Calcd. for $C_9H_7ONS$:N,7.90, Found, 7.82, 7.82.

The hydrochloride was obtained by adding dry acetone to its solution in absolute alcohol. After drying several days, this salt, when heated, melted first at 120–30° with loss of solvent, resolidified and then melted at 178–180°.

The free base corresponds to the following probable formula:

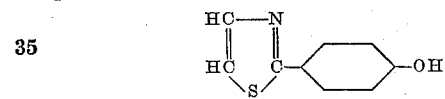

2-para-hydroxyphenyl-thiazole may, of course, also be obtained by initially employing para-hydroxythiobenzamide in the process illustrated in Example 1 instead of the corresponding thioanisamide, or 2-para-ethoxyphenylthiazole may, of course, be de-ethylated to produce the final thiazole after the manner of the process of Example 2.

(3) *2 - (para - methoxyphenyl) - 4-methyl-thiazole.*—A mixture of 30 grams of thioanisamide and 17 grams of chloracetone of the formula:

in 100 cc. of 95% alcohol was refluxed for 2 hours. Upon diluting the reaction mixture with water 2-(para-methoxyphenyl)-4-methyl-thiazole deposited as an oil. The compound in the form of the free base corresponds to the following probable formula:

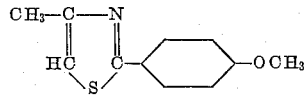

It can be distilled under reduced pressure. The free base boiled at 168° at 7 mm. Upon standing for some time, the product solidified and was recrystallized from petroleum ether. It melted at 56–57°. Anal. Calcd. for $C_{11}H_{11}ONS$:N,6.83. Found, 7.00, 7.09.

The hydrochloride was obtained by precipitation from its solution in absolute alcohol, in which it is very soluble, by the addition of small amounts of ether. It separates as colorless needles which melted at 105–107°, resolidified and then again melted at 130–132°.

In the above example, other alkoxyphenylthioamides may, of course, be employed instead of the particular thioanisamide described, in which case the final product will only differ from the 2-paramethoxyphenyl-4-methylthiazole in the alkoxy group occupying the para-position of the phenyl substituent. Other 4-alkylthiazole compounds may be obtained by substituting for the chloracetone the corresponding chlorketone necessary to introduce the final alkyl group desired. If, for example, there be employed chloromethylethylketone instead of chloracetone, the final thiazole obtained will be the 2-paramethoxyphenyl-4-ethylthiazole.

(4) *2-(para - hydroxyphenyl)-4 - methyl - thiazole.*—5 grams of 2-(para-methoxyphenyl)-4-methyl-thiazole were refluxed with 30 cc. of 48% hydrobromic acid for three hours. The solution was then diluted with 100 cc. of water and neutralized with ammonia. The precipitate of 2-(para-hydroxyphenyl)-4-methyl-thiazole, which in the form of the free base corresponds to the following probable formula:

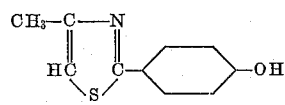

was completely soluble in alkali. It was recrystallized from hot absolute alcohol and melted at 220–221°. Anal. Calcd. for $C_{10}H_9ONS$:N,7.32. Found, 7.08, 7.18. The free base can be converted into a hydrochloride.

As indicated in Example 2, it is not necessary to obtain the above hydroxyphenylthiazole by demethylation of the corresponding methoxy compound. The 2 - para - hydroxyphenyl - 4 - methyl-thiazole may be obtained according to the process illustrated in Example 3, by employing instead of the thioanisamide, the corresponding para-hydroxy-thiobenzamide.

(5) *2 - (para-methoxyphenyl) - 4 - (3,4 - dihydroxyphenyl) -thiazole.*—An alcoholic solution of 15 grams of chloroacetocatechol of the formula:

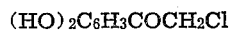

$(HO)_2C_6H_3COCH_2Cl$ and 12.5 grams of thioanisamide was refluxed for two hours and the thiazole compound then precipitated by the addition of water. The product corresponding in the form of the free base to the probable formula:

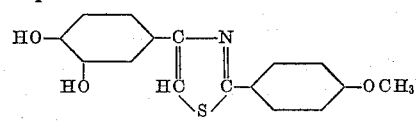

separated as an oil which slowly solidified. The new compound contained water of hydration and upon being crystallized from 95% alcohol several times, 2 mols of water of hydration were still retained. M. P. 154–5°. Anal. Calcd. for $C_{16}H_{13}O_3NS$:N,4.68. Found, 4.61, 4.66. Loss of water on heating at 120°: Calcd. for $2H_2O$, 10.42. Found, 10.54.

The hydrochloride was prepared by adding alcoholic hydrogen chloride to an ether solution of the thiazole base. A precipitate separated which soon crystallized. It melted at 206–208°.

If in the above example instead of chloroacetocatechol there be employed para-hydroxychloroacetophenone, the corresponding 2-paramethoxyphenyl - 4 -para-hydroxyphenyl-thiazole will be obtained. It is likewise not necessary that the halogen methylene compound employed as one of the parent materials contain free hydroxyphenyl groups, inasmuch as the corresponding alkoxy compounds are readily applicable to the reaction. For example, instead of the chloroacetocatechol, above employed, there may be used the corresponding dimethoxy compound, i. e. 3.4-dimethoxy-chloroacetophenone.

(6) *2 - (para - hydroxyphenyl) - 4 - (3,4-dihydroxyphenyl) -thiazole.*—8 grams of 2-(para-methoxyphenyl)-4-(3,4-dihydroxyphenyl)-thiazole were refluxed for five hours with 75 cc. of 48% hydrobromic acid. The mixture was then poured into several volumes of water, whereupon the hydrobromide salt of the thiazole precipitated in the form of yellow needles. Upon filtering and dissolving the needles in water, the free base of 2-(para-hydroxyphenyl)-4-(3,4-dihydroxyphenyl)-thiazole corresponding in the form of the free base to the following probable formula:

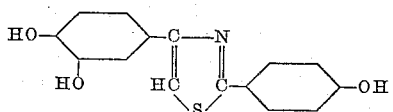

was precipitated by means of ammonia. The product crystallized from dilute alcohol as lustrous needles containing 2 mols of water of hydration. When heated, it lost water at 110–115°, then melted at 212–13°. Anal. Calcd. for $C_{15}H_{11}O_3NS.2H_2O$:N,4.36. Found, 4.27. The free base can be easily converted into the hydrochloride.

(7) *2 - (3,4 - dihydroxyphenyl) - 4 -(3,4 - dihydroxyphenyl) -thiazole.*—A solution of 10.25 grams of chloroacetocatechol and 8.45 grams of 3,4-dihydroxythiobenzamide of the formula:

$$(HO)_2C_6H_3CSNH_2$$

in 100 cc. of 95% alcohol was refluxed for an hour. A mass of crystals of the hydrochloride of 2-(3,4-dihydroxyphenyl)-4-(3,4-dihydroxyphenyl)-thiazole corresponding in the form of the free base to the following probable formula:

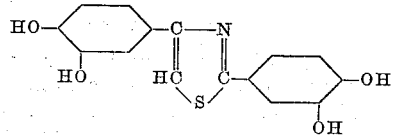

had separated at the end of the reaction. 100 cc. of water was added to the mixture and the alcohol distilled off. The yellow residue of the free thiazole base remaining was recrystallized from 30% alcohol. It is best purified by crystallization from hot water in which it is slightly soluble and from which it is obtained in a form containing one molecule of water of hydration. When heated in a melting point tube it loses a molecule of water at 135–140°, resolidifies and melts at 204°. Anal. Calcd. for $C_{15}H_{11}O_4NS.1H_2O$: 4.39. Found, 4.37, 4.51. The pure product darkens slowly on exposure to the light.

(8) *2-(3,4-dihydroxyphenyl) -thiazole.*—A mixture of 4 grams of bromoacetal and 3.4 grams of 3,4-dihydroxythiobenzamide in 25 cc. of alcohol was refluxed for 2 hours. 100 cc. of water was added and the solution evaporated nearly to dryness on the steam bath. 2-(3,4-dihydroxyphenyl)-thiazole hydrobromide separated in form of an oil which solidified upon cooling. The free base corresponding to the following probable formula:

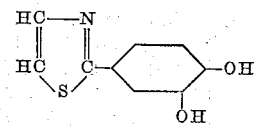

separated when a water solution of the hydrobromide was made neutral. It melted at 181°. Anal. Calcd for $C_9H_7O_2NS$:N,7.26. Found, 7.39.

(9) *2 - (3,4 - dihydroxyphenyl) - 4 - methyl-thiazole.*—A solution of 4.5 grams of chloroacetone and 8.5 grams of dihydroxythiobenzamide in 100 cc. of absolute alcohol was refluxed for an hour. The hydrochloride of 2-(3,4-dihydroxyphenyl)-4-methyl-thiazole separated from the solution.

The free base corresponding to the following probable formula:

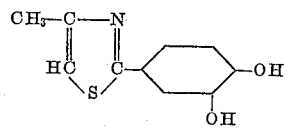

was obtained by adding alkali to a water solution of the hydrochloride. It was recrystallized from dilute alcohol and separated from solution as colorless needles. Anal. Calcd. for $C_{10}H_9O_2NS$: N, 6.76. Found, 6.74.

(10) *2-(3,4-methylene-dihydroxyphenyl)-thiazole.*—A solution of 18 grams of thiopiperonylamide of the formula:

$$CH_2O_2C_6H_3CSNH_2$$

and 20 grams of bromoacetal in 100 cc. of absolute alcohol to which 3 cc. of concentrated hydrochloric acid had been added was refluxed for forty minutes. A large amount of precipitate of 2-(3,4-methylene-dihydroxyphenyl)-thiazole hydrochloride formed. Water was added to dissolve this precipitate and the solution made alkaline. The free base corresponding to the following probable formula:

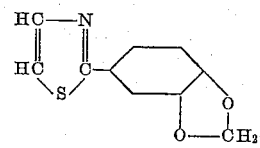

separated in form of an oil which soon solidified. It crystallized from dilute alcohol in form of lustrous light yellow plates, melting at 84–85°. Anal. Calcd. for $C_{10}H_7O_2NS$:N,6.83. Found, 6.73.

The hydrochloride obtained from an alcohol-ether mixture decomposed when heated at about 216°.

If in the above example instead of thiopiperonylamide the corresponding ethylene dioxy compound be employed, there will be obtained the corresponding 2-(3,4-ethylene-dihydroxyphenyl)-thiazole compound.

(11) *2-(3,4 - methylene - dihydroxyphenyl)-4-methyl-thiazole.*—A solution of 9.1 grams of thiopiperonylamide and 4.7 grams of chloroacetone in 150 cc. of absolute alcohol was refluxed for 2 hours. Upon cooling the solution a mass of light yellow crystals of 2-(3,4-methylene-dihydroxyphenyl)-4-methyl-thiazole hydrochloride separated. It melted when dry at 190–91°, and contained one molecule of alcohol of crystallization. It was decomposed by water, giving the free base corresponding to the following probable formula:

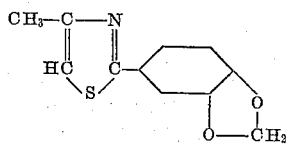

which melts at 93–95°. Anal. Calcd. for $C_{11}H_9O_2NS$:N,6.36. Found, 6.25, 6.37.

Other 4-alkylthiazole compounds may be obtained by substituting for the chloroacetone above employed, the corresponding chloromethylalkylketone. For example, if chloromethylethylketone be used instead of chloroacetone, the corresponding 2-(3,4-methylene-dihydroxyphenyl)-4-ethyl-thiazole will result.

(12) *2-(3,4 - methylene-dihydroxyphenyl)-4-(3,4-dihydroxyphenyl)-thiazole.*—A solution of 9.1 grams of thiopiperonylamide and 10.2 grams of chloroacetocatechol in 150 cc. of absolute alcohol was refluxed for an hour. Upon standing the solution deposited yellow crystals of the hydrochloride of 2-(3,4-methylene-dihydroxyphenyl)-4-(3,4-dihydroxyphenyl)-thiazole. The hydrochloride melted at 212–216° with decomposition. The thiazole base corresponding to the following probable formula:

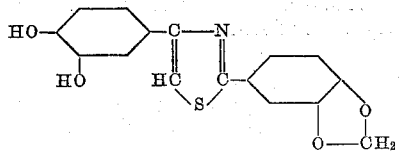

was obtained by decomposing the hydrochloride with water. It was crystallized from dilute alcohol, being obtained in a form containing one molecule of water of hydration, melting at 135–140° with a loss of one molecule of water, the anhydrous product finally melting at 184–185°. Anal. Calcd. for $C_{16}H_{11}O_4NS:0.5H_2O:N,4.23$. Found, 4.16, 4.13.

It is, of course, unnecessary to employ an unsubstituted oxyphenyl-chloro-methylketone in the above example, in order to insure the operativeness of the process there described. The corresponding dialkoxy compounds may be substituted for the chloroacetocatechol above employed, in which case the corresponding dialkoxy-thiazoles result. For example, if instead of the chloroacetocatechol, there be employed 3,4-dimethoxyphenylchloromethylketone, the corresponding 2 - (3,4 - methylene-dihydroxyphenyl)-4-(3,4-dimethoxyphenyl)-thiazole will be obtained.

(13) *2 - (para - diethylaminoethoxyphenyl)-4-methyl-thiazole.*—A mixture of 16 grams of 2-(para-hydroxyphenyl)-4-methyl-thiazole with 12 grams diethylaminoethyl chloride of the formula: $(C_2H_5)_2NCH_2CH_2Cl$ in 150 cc. of absolute alcohol in which 1.9 grams of sodium were dissolved was heated on reflux for 2 hours. The alcohol was distilled off and the remaining residue taken up with water. 2-(para-diethylaminoethoxyphenyl)-4-methyl-thiazole corresponding in the form of the free base to the following probable formula:

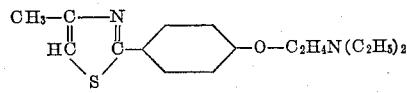

separated in form of an oil which after dissolving in ether was separated from water. The ether solution was dried. The dihydrochloride was obtained in the form of white crystals easily soluble in water by adding a dilute alcoholic solution of hydrogen chloride to the ether solution of the base. Anal. Calcd. for $C_{16}H_{24}ONSCl_2$: Cl,19.56. Found, 19.35.

2-(para-diethylaminoethoxyphenyl)-4-methyl-thiazole can also be obtained by condensing para-diethylaminoethoxy-thiobenzamide of the formula: $(C_2H_5)_2NC_2H_4OC_6H_4CSNH_2$ with chloracetone in the manner described in Example 3.

In the above example other dialkyl-amino-alkyl-chlorides may be employed as may monoalkyl-amino-alkyl chlorides. For example, instead of diethyl-amino-ethyl-chloride, dimethyl-amino-ethylchloride may be used, in which case the corresponding 2 - (para - dimethyl - aminoethoxyphenyl)-4-methyl-thiazole compound will result, or other alkyl-amino-alkoxy-thiazole compounds may be obtained by reacting chloracetone with other para-dialkyl-amino-alkoxy-thiobenzamides; for example, chloracetone may be reacted with para-dimethyl-amino-methoxy-thiobenzamide, in which case there will be obtained the corresponding 2-(para-dimethyl-amino-methoxyphenyl)-4-methyl-thiazole.

I claim:

1. Thiazole compounds corresponding in the form of their free bases to the following formula:

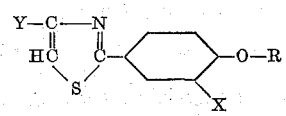

wherein X may be hydrogen, OH, alkoxy, O-acyl, aminoalkoxy, alkylaminoalkoxy or dialkylaminoalkoxy, R may be hydrogen, alkyl, acyl, alkylaminoalkyl, aminoalkyl, or dialkylaminoalkyl, or R and X taken together may be an alkylene -O-radical, and Y may be alkyl, phenyl, alkyl-substituted phenyl, mono- or dihydroxyphenyl or mono- or dialkoxyphenyl, which compounds possess valuable therapeutic properties.

2. Thiazole compounds corresponding in the form of their free bases to the following formula:

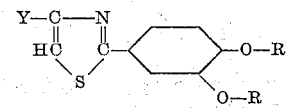

wherein R may be hydrogen, alkyl, acyl, aminoalkyl, alkylaminoalkyl, dialkylaminoalkyl, or the two R's taken together may be an alkylene radical, and Y may be alkyl, phenyl, alkyl-substituted phenyl, mono- or dihydroxyphenyl or mono- or dialkoxyphenyl, which compounds possess valuable therapeutic properties.

3. Thiazole compounds corresponding in the form of their free bases to the following formula:

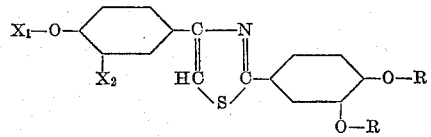

wherein R may be hydrogen, alkyl, acyl, aminoalkyl, alkylaminoalkyl, dialkylaminoalkyl, or the two R's taken together may be an alkylene radical, and $X_1$ may be alkyl, $X_2$ hydrogen, OH or alkoxy, or $X_1$ and $X_2$ taken together may be an alkylene-hydroxy group, which compounds possess valuable therapeutic properties.

4. A process comprising heating a thioamide compound of the formula:

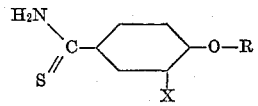

wherein X may be hydrogen, OH, alkoxy, O-acyl, aminoalkoxy, alkylaminoalkoxy or dialkylaminoalkoxy, R may be hydrogen, alkyl, acyl, alkylaminoalkyl, aminoalkyl or dialkylaminoalkyl, or R and X taken together may be an alkylene -O-radical, with a halogen methylene compound of the formula:

$$Z—CY—CH_2 \text{ Halogen}$$

wherein Y may be hydrogen in which case Z stands for two alkoxy groups, or Y may be oxygen in which case Z stands for alkyl, hydroxyphenyl or an aryl radical of the benzene series.

5. A process comprising heating a thioamide compound of the formula:

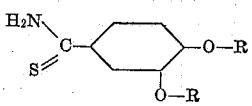

wherein R may be hydrogen, alkyl, acyl, aminoalkyl, alkylaminoalkyl, dialkylaminoalkyl, or the two R's taken together may be an alkylene radical, with a halogen methylene compound of the formula:

Z—COCH₂ Halogen wherein Z stands for an alkyl or an hydroxyphenyl radical.

6. A process comprising heating a thioamide compound of the formula:

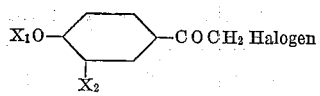

wherein R may be hydrogen, alkyl, acyl, aminoalkyl, alkylaminoalkyl, dialkylaminoalkyl, or the two R's taken together may be an alkylene radical, with a halogen methylene compound of the formula:

$X_1O$—⟨⟩—$COCH_2$ Halogen
$X_2$ wherein $X_1$ may be alkyl or hydrogen, $X_2$ hydrogen, OH or alkoxy, or $X_1$ and $X_2$ taken together may be an alkylene-hydroxy group.

7. Thiazole compounds corresponding in the form of their free bases to the following formula:

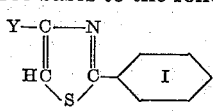

wherein the benzene nucleus designated by "I" contains at least one hydroxy group in the ortho, meta, or para-position, the hydrogen of which may be substituted by alkyl, acyl, aminoalkyl, alkylaminoalkyl or dialkylaminoalkyl, or in case "I" contains two OH groups in the ortho-position the hydrogen of such OH groups may be substituted as stated above, or the two oxygens of such ortho-positioned OH groups may be joined together by an alkylene linkage, and Y may be alkyl, phenyl, alkyl-substituted phenyl, or a substituted or unsubstituted hydroxy-phenyl group as defined above for phenyl group I, which compounds possess valuable therapeutic properties.

8. A process comprising heating a thioamide compound of the formula:

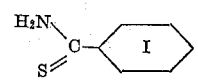

wherein the benzene nucleus designated by "I" contains at least one hydroxy group in the ortho, meta, or para-position, the hydrogen of which may be substituted by alkyl- acyl, aminoalkyl, alkylaminoalkyl or dialkylaminoalkyl, or in case "I" contains two OH groups in the ortho-position the hydrogen of such OH groups may be substituted as stated above, or the two oxygens of such ortho-positioned OH groups may be joined together by an alkylene linkage, with a halogen methylene compound of the formula:

Z—CY—CH₂ Halogen wherein Y may be hydrogen in which case Z stands for two alkoxy groups, or Y may be oxygen in which case Z stands for alkyl, hydroxy phenyl or an aryl radical of the benzene series.

TREAT B. JOHNSON.